Dec. 16, 1941.  E. N. ING  2,266,677
GARDEN IMPLEMENT
Filed Jan. 29, 1940
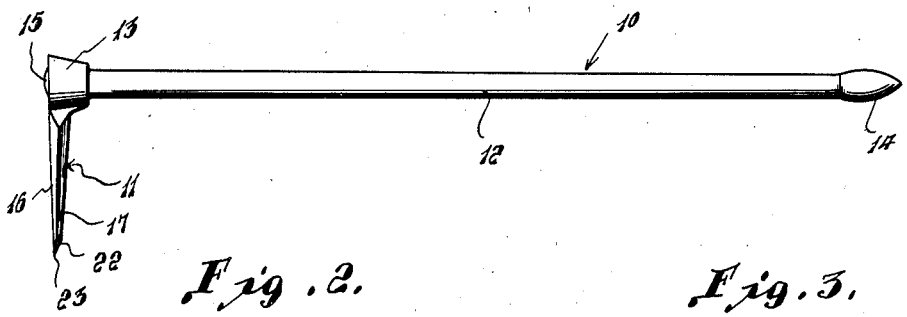
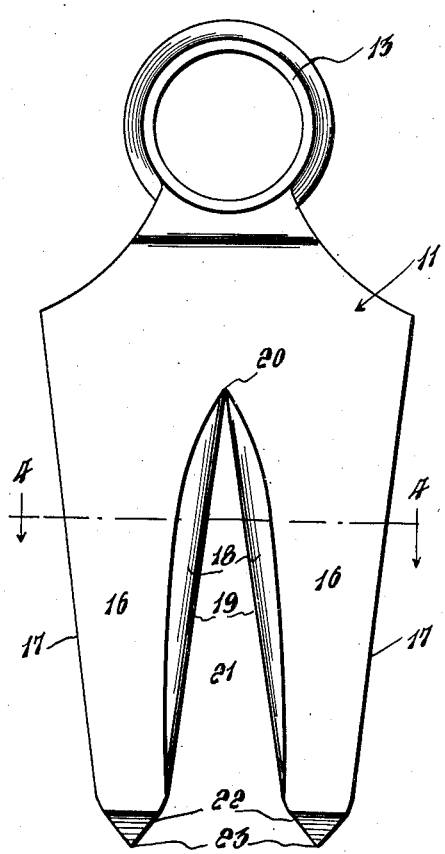
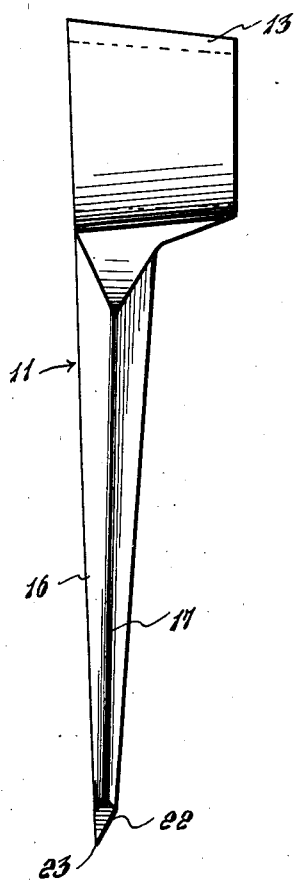
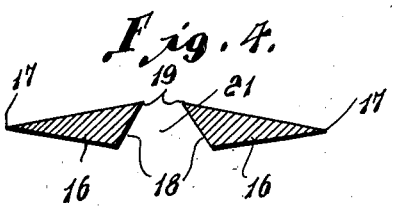
Inventor
Edward N. Ing
By L. F. Randolph
Attorney Patented Dec. 16, 1941

2,266,677

UNITED STATES PATENT OFFICE 2,266,677

GARDEN IMPLEMENT

Edward N. Ing, Honolulu, Territory of Hawaii

Application January 29, 1940, Serial No. 316,246

1 Claim. (Cl. 97—66)

This invention relates to an improved tool for use in gardening and aims to provide a tool especially adapted for use in digging and cultivating the earth.

More particularly, it is an aim of this invention to provide a tool primarily designed and adapted to replace the pick mattock and provided with a long handle to enable the operator to stand in an upright position while using the tool.

Still another aim of the invention is to provide a tool of the character heretofore referred to having a head provided with a pair of spaced tapered tines or prongs having pointed free ends and sharpened longitudinal edges which are adapted to readily penetrate either loose soil or hard ground.

Still another aim of the invention is to provide prongs or tines which are triangular in cross section to provide the maximum strength and to thereby enable the tool to be used for prying without risk of breaking off the tines.

Other objects and advantages of the invention will hereinafter become more fully apparent from the following description of the drawing, which illustrates a preferred embodiment thereof, and wherein:

Figure 1 is a side elevational view of the tool,

Figure 2 is an enlarged front elevational view of the tool head,

Figure 3 is an enlarged side elevational view of the tool head, and

Figure 4 is a transverse sectional view taken substantially along the plane of the line 4—4 of Figure 2.

Referring more particularly to the drawing, wherein like reference characters designate like or corresponding parts throughout the different vews, 10 designates generally the tool or implement comprising the invention and including generally the head 11 and the handle 12.

The tool head 11 is provided with a tapered upper end terminating in an eyelet 13 the bore of which, as best seen in dotted lines in Figure 3, converges toward the inner side of the head 11 so that the pointed end 14 of handle 12 may be inserted therethrough. The diameter of the handle 12 increases from the end 14 to the end 15. The handle 12 is passed through the eyelet 13 up to the end 15 around which it snugly fits and due to its converging shape prevents removal of the tool head 11 except by passing it off the end 14.

Tool head 11 is provided with a pair of tines or prongs 16 at its opposite end, each of which is triangular in cross section, as best seen in Figure 4. The corresponding tines 16 taper laterally toward their outer edges 17, which edges converge toward the free ends of the tines. The inner edges of the tines are beveled, as indicated at 18, to form edge portions 19 which converge upwardly to a point at 20 to form a downwardly diverging space 21 therebetween. As best seen in Figure 3, the thickness of the tines 16 also diminishes towards their free ends which are beveled on their outer and inner edges and forward sides as at 22, in Figures 2 and 3, to form pointed ends 23 which are adapted to penetrate the ground.

From the foregoing it will be obvious, that the tool 10 is well adapted for uses similar to a pick mattock, as in digging up the earth to form flower beds, loosening the ground around trees and plants, trenching and ditching or for harvesting potatoes and other vegetables and turning over the soil after the harvest. The handle 12 is of sufficient length so that the user may stand upright in operating the tool and the head 11 is sufficiently light so that it may be used without the effort required to operate a pick mattock but which will accomplish the same results with substantially the same degree of efficiency due to the increased length of the handle and the additional leverage afforded thereby. The tines 16 by being tapered toward their pointed ends 23 will readily penetrate hard ground and the triangular cross sectional shape of the tines, as illustrated in Figure 4, will provide sufficient strength to enable the tool to be used for prying up and for turning over hard ground without breaking off the tines.

Various modifications and changes in the invention are contemplated and may obviously be resorted to as only a preferred embodiment thereof has been illustrated and described.

I claim as my invention:

An agricultural implement comprising an implement head having a relatively wide and thick upper portion, a pair of tines depending therefrom, said tines having angularly disposed, substantially flat front and back faces which converge toward their outer edges, said tines having relatively wide inwardly and rearwardly inclined inner edges, said inner edges converging toward their upper ends, and said inner edges tapering in width toward their ends.

EDWARD N. ING.